United States Patent [19]

Ploeg

[11] 4,101,634
[45] Jul. 18, 1978

[54] PROCESS FOR THE SIMULTANEOUS REMOVAL OF NITROGEN AND SULFUR OXIDES FROM A GAS STREAM

[75] Inventor: Johannes E. G. Ploeg, The Hague, Netherlands

[73] Assignee: Shell Oil Company, Houston, Tex.

[21] Appl. No.: 765,709

[22] Filed: Feb. 4, 1977

[30] Foreign Application Priority Data

Feb. 11, 1976 [NL] Netherlands ................... 7601371

[51] Int. Cl.$^2$ ............................................. B01D 53/34
[52] U.S. Cl. ................................... 423/239; 423/244
[58] Field of Search ............... 423/239, 242, 244, 235, 423/351

[56] References Cited

U.S. PATENT DOCUMENTS

| 3,778,501 | 12/1973 | Lang et al. ........................ 423/244 |
| 3,816,597 | 6/1974 | Smith ................................ 423/244 |
| 3,993,731 | 11/1976 | Morikawa et al. ................ 423/239 |
| 4,002,723 | 1/1977 | Inaba et al. ....................... 423/239 |

FOREIGN PATENT DOCUMENTS

| 804,317 | 2/1974 | Belgium ............................ 423/239 |
| 804,317 | 2/1974 | Belgium ............................ 423/239 |
| 2,504,027 | 8/1975 | Fed. Rep. of Germany ....... 423/239 |

OTHER PUBLICATIONS

"Chemical Abstracts" vol. 84, 1976 (Jan. 21, 1976), p. 307–21719r & 21720j.

*Primary Examiner*—G. O. Peters

[57] ABSTRACT

A process for the simultaneous removal of nitrogen oxides and sulfur oxides from a gas stream containing oxygen, in addition to nitrogen oxides and sulfur oxides, is disclosed.

5 Claims, 1 Drawing Figure

U.S. Patent July 18, 1978 4,101,634
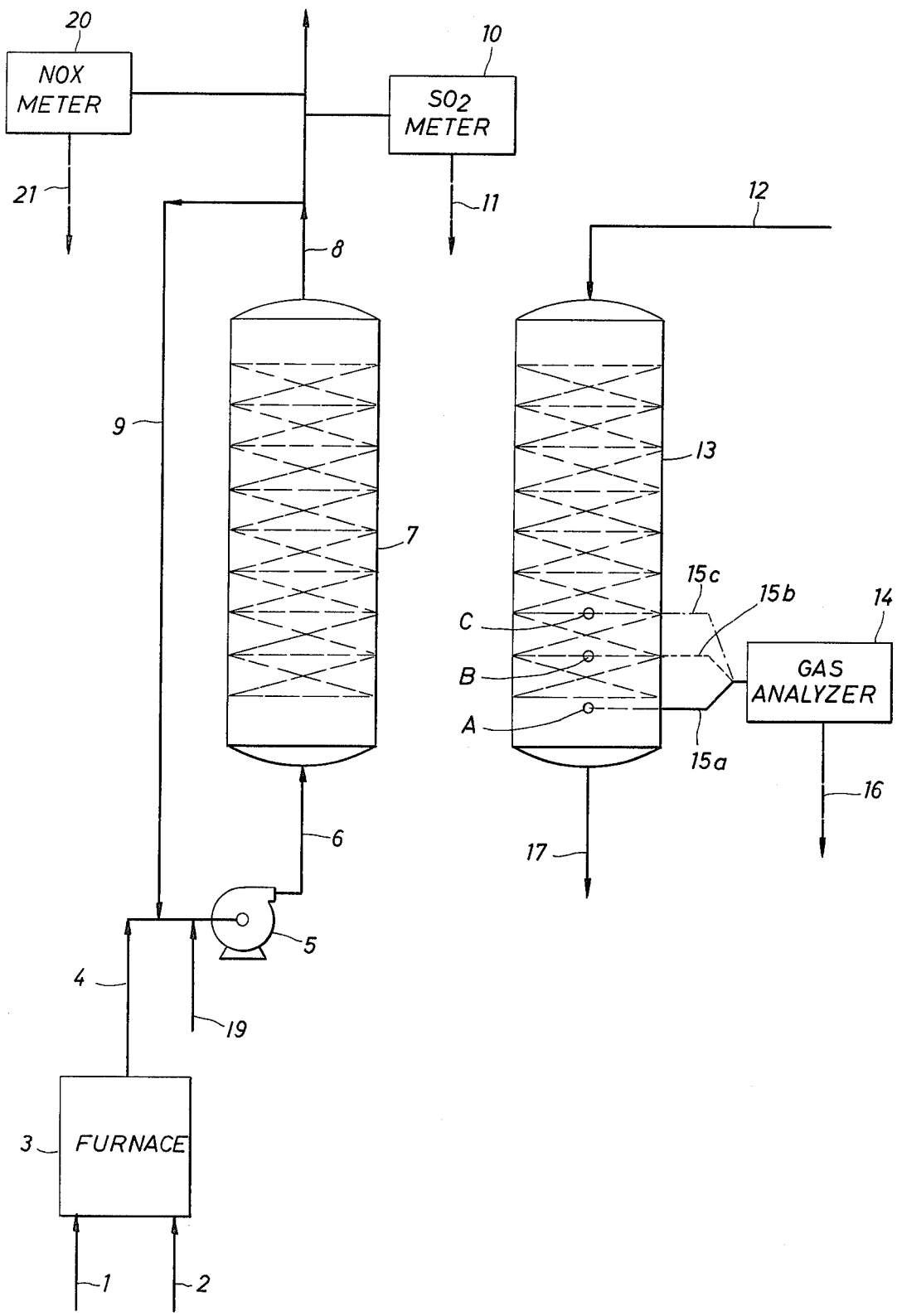

PROCESS FOR THE SIMULTANEOUS REMOVAL OF NITROGEN AND SULFUR OXIDES FROM A GAS STREAM

BACKGROUND OF THE INVENTION

In one known process, sulfur oxides, such as sulfur dioxide and sulfur trioxide, are removed from oxygen-containing industrial off-gases by use of a copper-containing acceptor for the sulfur compounds. According to the process, a reduced acceptor, which contains copper as metallic element, is contacted first with an oxygen-containing off-gas to oxidize the metallic copper to copper oxide. Only in the oxidic form is the copper acceptor capable of binding the sulfur oxides as sulfate by chemisorption. At the same time, sulfur dioxide is oxidized to sulfur trioxide.

After a given time, the acceptor, depending on the quantity by weight of copper supported on the acceptor carrier, will be fully or almost fully loaded and will need to be regenerated. For regeneration, reducing gases are used. Preferably, hydrogen- and/or carbon monoxide-containing gas mixtures containing 5-30 percent by volume of hydrogen in addition to inert components such as steam, nitrogen and/or carbon dioxide as diluent are employed. As a result of the regeneration, the sulfate on the acceptor is decomposed and the bound sulfur oxide is released as dioxide. A reduced acceptor remains, which contains metallic copper, and the acceptor can be re-used for the acceptance of sulfur oxides as described previously. The chemistry of the oxidation and reduction reactions involved in this process have been comprehensively discussed in Petroleum and Petrochemical International, July 1972, pages 44 and 45.

Nitrogen oxides, which include NO and $NO_2$, and are customarily referred to as NOX, occur in all industrial off-gases obtained by combustion with air. They also occur in the off-gases from chemical plants, such as nitric acid plants. Nitrogen oxides are also known to be atmospheric pollutants, and their removal from off-gases is therefore desirable.

A process has already been proposed in which both sulfur dioxide and NOX are removed simultaneously from industrial off-gases by adding ammonia to such off-gases and passing the off-gases over a copper-containing acceptor in order to accept the sulfur oxides. This proposal is based on the observation that nitrogen oxides are reduced to free nitrogen with ammonia in the presence of a copper oxide-containing catalyst. The reactions involved in that process are generally represented by the following total equations:

$$6 NO + 4 NH_3 \rightarrow 5 N_2 + 6 H_2O \qquad (1)$$

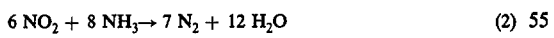

$$6 NO_2 + 8 NH_3 \rightarrow 7 N_2 + 12 H_2O \qquad (2)$$

Although nitrogen oxides can be converted into nitrogen to a degree of almost 90 percent or more by means of ammonia and a copper oxide-containing catalyst, the conversion of nitrogen oxides with the simultaneous removal of sulfur oxides by means of a copper-containing acceptor proves not to exceed 70 percent.

I have now found that the cause for this limited reduction is related to the peculiarities of the process for the removal of sulfur oxides by means of a copper-containing acceptor. More particularly, both the acceptance and the regeneration of the acceptor are carried out at temperatures which are not higher than 475° C.

Preferably, the temperature for both process steps is roughly 400° C. It appears, however, that the said oxidation of the reduced acceptor in which the metallic copper is converted into copper oxide is accompanied by large heat generation. This oxidation reaction, which takes place at the moment the oxygen-containing off-gas is contacted with the reduced acceptor bed with a sharply defined reaction front. Simultaneously, a temperature peak of more than 500° C (approx. 550° C to 600° C, depending on the copper content of the acceptor), passes through the acceptor bed.

Although the average bed temperature scarcely rises because of this temperature peak - in practice it has been found that when the flue gases are contacted with the reduced acceptor at a temperature of 400° C, a temperature rise of 10° to 30° C can occur in the bed — the temperature peak passing through the bed therefore causes local temperatures of 600° C. If ammonia is added to the flue gas for the reduction of NOX, this high initial temperature at the first introduction following regeneration of the acceptor will contribute to cause the oxidation of ammonia and NOX will be additionally formed:

$$4 NH_3 + 5 O_2 \xrightarrow{Cu\text{-}cat} 4 NO + 6 H_2O \qquad (3)$$

This inverted reaction, which takes place above 500° C and in which the copper-containing acceptor acts as catalyst, is the cause of the NOX conversion not exceeding 70 percent.

Improvement may be accomplished by ensuring that during the initial phase of the desulfurization process, when the flue gases are contacted with the reduced catalyst, no ammonia is present in or added to the gases to be treated. In this context, it must be borne in mind that the first quantities of flue gas which have passed through the acceptor bed will be free of sulfur oxide but will still contain nitrogen oxides. Considering the quantity of nitrogen oxides slipped through, it will not be possible to achieve a conversion in excess of 90 percent in this manner either.

SUMMARY OF THE INVENTION

Accordingly, the present invention comprises a process of the type described in which sulfur oxides and nitrogen oxides are removed simultaneously by use of a metal-containing acceptor with continuous addition of ammonia, or precursor thereof, and the metal containing acceptor is regenerated at regular intervals by a reducing gas, without the above mentioned drawbacks occurring. In one aspect, the process is characterizied in that the regeneration of the metal sulfate-loaded acceptor is effected by passing the reducing gas through the acceptor bed counter-currently to the direction in which the gase stream to be purified is passed through the bed, the regeneration being terminated at the moment when at least some of the acceptor is still in the sulfate form. The oxygen-containing gas stream to be purified is then recontacted with the acceptor with the simultaneous addition of ammonia or precursor.

Although the process of invention is applicable to any metal for the acceptor which is capable of binding sulfur oxides as sulfate, and of being regenerated by means of a reducing gas, the metal in the sulfate form also having catalytic activity for the reduction of NOX to nitrogen in the presence of ammonia, the process will be discussed hereinafter with reference specifically to copper-containing acceptors.

Surprisingly, it appears that the copper sulfate-loaded acceptor remains capable of catalyzing the reduction of nitrogen oxides with ammonia. Since the gas stream to be purified of sulfur oxides and nitrogen oxides first comes into contact with the copper sulfate-loaded acceptor, i.e. a non-reduced acceptor, the NOX is first converted to nitrogen before coming into contact with the reduced, metallic copper-containing acceptor when it passes further through the acceptor bed. During the occurrence of the high temperature peak caused by the abovementioned oxidation of the metallic copper to copper oxide, no or substantially no more ammonia will be present in the gas stream because it has already been converted into nitrogen during the reduction of nitrogen oxides.

An important requirement of the invention is that the regeneration of the sulfate-loaded acceptor is not continued to such a degree that all the acceptor in the acceptor bed has been converted to the metallic form. Of the acceptor material present, at least 10 percent by weight and preferably 12–30 percent by weight should remain in the sulfate form to be certain that all the added ammonia has reacted with the nitrogen oxide present in the first part of the acceptor bed.

In practice, this means that upstream of the acceptor bed of the copper-containing acceptor, an additional bed is provided of the same acceptor which already is or is brought into the sulfated form and is maintained in this form.

In or in between the beds of acceptor material means are provided which are capable of determining the moment when the regeneration gas contains free hydrogen. A hydrogen detector is therefore suitable for this purpose. The hydrogen is consumed during the regeneration of the copper sulfate-loaded acceptor. As soon as the hydrogen detector provided at that part of the acceptor bed which must remain in the sulfate form measures a certain quantity of hydrogen which indicates that the regeneration has proceeded to that point, the supply of reducing gas should be terminated.

The hydrogen detectors used in practice for this purpose are based on the principle of heat conductivity measurement. Generally, a gas stream is withdrawn from the reactor and analyzed outside the reactor. In practice, hydrogen detection is automated, and linked to the opening and closing of the desired valves.

The process for the removal of sulfur oxides by means of copper-containing acceptors in the presence of free oxygen is preferably carried out with at least two reactors so that one reactor can be used for acceptance while the loaded acceptor material in the other reactor is being regenerated. As soon as the acceptor in the first reactor has been fully loaded or loaded to the desired degree of loading, regeneration and acceptance are reversed. In practice, each reactor will first be purged with an inert gas, such as steam, in order to prevent the formation of explosive gas mixtures. The process scheme for a single reactor will therefore comprise: acceptance - purging - regeneration - purging - acceptance. The duration of the various periods is different and acceptance generally lasts longer than regeneration.

Since the off-gases to be treated generally also contain particular matter such as soot and ash, reactors of the "parallel passage" type are preferably used. Such as reactor is provided with a system of parallel gas channels and acceptor chambers, the gas channels being delimited by acceptor chambers with gas permeable walls. The sulfur oxides and nitrogen oxides come into contact with the acceptor material by diffusion through the gas-permeable walls.

Acceptors consisting of copper and/or copper oxide preferably supported on alumina as a carrier are very suitable for the removal of sulfur oxides from gases under oxidative conditions at temperatures above 300° C. Under the conditions in which the sulfur dioxide is chemically bound by the acceptor, sulfur trioxide is also removed from the gases, while it has further been found that hydrogen sulfide is oxided to sulfur dioxide and subsequently accepted.

The copper content of the acceptor can, partly depending on the specific surface area of the material used, vary within wide limits. As a rule it is from 1 to 15 percent by weight based on finished acceptor. Optimum results are obtained with acceptors which contain from 4 to 10 percent by weight of copper. The carrier material used is preferably an activated alumina such as gamma alumina, an alumina such as alpha-alumina, or a mixture of gamma- and alpha-alumina, although in principle all solids are eligible which are temperature resistant and are not corroded by sulfur oxides under the prevailing conditions.

For a removal process to be economic, it is necessary that the acceptor used be capable of regeneration some thousands of times without loss of substantial stability and activity. It will not be easy to achieve such a long lifetime with acceptors which have to be heated and/or cooled through a relatively large temperature range each time they are regenerated. The chemical and physical stability of the metal- and/or metal compounds-containing acceptors can in fact be considerably impaired by this temperature fluctuation. The great advantage of copper-containing acceptors is that after loading with sulfur oxides under the formation of copper sulfate, they can be regenerated at the same or substantially the same temperature as that at which acceptance took place. Working at acceptance and regeneration temperatures which differ but slightly is not only advantageous from the viewpoint of heat economy but also of very great importance for the lifetime of the acceptor.

The removal of sulfur compounds in the form of sulfur oxide under oxidative condtions, i.e. in the presence of oxygen, is preferably effected at temperatures from 325° to 475° C. The regeneration under reducing conditions takes place in the same temperature range. Preferably, both acceptance and regeneration are effected with this range at the same or substantially the same temperature.

For the regeneration of acceptors of the above-mentioned type, a reducing gas, such as hydrogen or a hydrogen-containing gas diluted with steam, is preferably used. Hydrocarbon-containing gases such as the off-gas from a catalytic reformer are also suitable for the regeneration of sulfur oxide loaded metal-containing catalysts. Suitable hydrogen-containing gases may be obtained by partial oxidation or steam-reforming of hydrocarbons.

The addition of steam to the reducing gas has a dual purpose. First, the regeneration of the loaded acceptor with the formation of sulfur dioxide is an exothermic reaction. Also, the non-converted copper oxide is reduced to the metallic element, which produces an additional heat effect. Dilution with steam ensures that this liberated heat is removed. Secondly, diluting with steam ensures that the concentration of reducing gas, in particular hydrogen, remains low, which is advantageous for the process since the subsequent purging with inert gas, such as steam, can be of shorter duration.

Steam-diluted hydrogen and carbon monixide-containing gases can be obtained in a simple manner by steam-reforming of natural gas, methane and/or lower homologues thereof. Naphtha may also very suitably be used. The mixture obtained by steam-reforming over a catalyst contains approximately 35 to 40 percent by volume of steam. Additional steam may be added to this steam-containing mixture in such a quantity that the steam content is from 60 to 95 percent by volume. It is also possible for the steam-reforming to be carried out in such a manner that a gas mixture is obtained which contains the desired quantity of steam. The hydrogen-containing reducing gas obtained by steam-reforming is introduced directly into the acceptor bed to be regenerated.

When a "parallel passage" reactor is used, the gas velocities used are such that the linear gas velocity in the gas channels is between 2 and 25 m/s. If fixed acceptor beds are used, the space velocity is 1000 – 10.000 vol./vol. of acceptor/hour and preferably 2000 – 5000 vol./vol. of acceptor/hour.

For the reduction of nitrogen oxides, ammonia in a quantity of 1 to 3 times the requisite stoichiometric quantity is supplied to the gas to be treated. Preferably, this quantity is 1.5 to 2.0 times the requisite quantity.

According to the process of the invention, substantially quantitative reduction of NOX can be achieved. Ammonia is generally not detected in the flue gases treated, not even if a considerable excess in respect to the stoichiometric quantity has been added.

Instead of gaseous ammonia it is also possible to add precursors of ammonia, such as an aqueous solution of ammonia, or an ammonium carbonate solution, urea, hydrazine, ethylene diamine or hexamethylene diamine.

The process according to the invention will be further elucidated with reference to the example and the accompanying drawing.

EXAMPLE

Heavy oil was supplied through line 2, and air through line 1, to furnace 3. The furnace burned 7.1 tons of heavy oil containing 4 percent by weight of sulfur per hour with a 25 percent excess of air.

Flue gases originating from the furnace in line 4 were treated in a flue-gas desulfurization unit which comprised two reactors 7 and 13 of the "parallel passage" type, each reactor being 7 meters in length.

The flue gases, which contained approximately 0.2 percent by volume of $SO_2$, 0.035 percent by volume of NOX (principally as NO) and 4.0 percent by volume of $O_2$, were passed by means of a booster 5 via lines 4 and 6 through one of the two reactors 7 and 13 together with some of the already desulfurized flue gases supplied through a line 9. - In the case shown, reactor 7 is in the acceptance phase while reactor 13 is in the regeneration phase. The space velocity was 3400 Nl/l of acceptor per hour and the acceptance temperature was 420° C.

After about 110 minutes, the copper-containing acceptor, which contained approximately 5 percent by weight of copper on an alumina carrier, was so loaded with sulfur oxides that the average $SO_2$ removal level had fallen to 90 percent. At the moment the flue gas stream was switched to reactor 13 where the regeneration of the acceptor present therein had been completed. After first having been purged for about 5 minutes with an inert gas, the partly sulfated acceptor in reactor 13 had been regenerated by means of a gas stream containing 20 percent by volume of reducing gas ($H_2$, CO and $CH_4$) and consisting for the rest of inert gases such as water vapor and nitrogen. The regeneration gas was passed counter-currently through the reactor via a line 12. The sulfur dioxide-containing off-gas formed during the regeneration was discharged through a line 17 to a linearization and concentration unit (not shown) for the further working-up of the sulfur dioxide.

The "acceptance" time (the time required for the removal of the sulfur dioxide from the flue gas) was set with reference to the $SO_2$ concentration in the treated flue-gas stream which was passed through a line 8 to a stack to be discharged to the atmosphere. This time is principally determined by the quantity and the sulfur content of the oil burned in the furnace and the required or desired $SO_2$ removal level. The $SO_2$ meter 10 used was one of the type which determines the $SO_2$ concentration by means of infrared absorption. For the $SO_2$ measurement, a small quantity of flue-gas was continuously withdrawn from the flue-gas stream in line 8 and cooled to 2° C in order to condense most of the water vapor. Via a connection (11), a measurement signal was transmitted to the control panel (not shown).

The quantity of regeneration gas required was roughly set with reference to the acceptance time and the quantity of sulfur oxides removed in this period, but it waS adjusted with reference to the hydrogen concentration in the regeneration off-gas after passing the final acceptor bed. This hydrogen concentration was measured with a gas analyzer 14 working on the principle of heat conductivity. The measuring was carried out by continuously withdrawing a small quantity of regeneration gas at the point A through a line 15a and cooling it to approximately 50° C in order to remove excess water vapor. A measurement signal was transmitted via connection 16 to the control panel (not shown). The location for this analysis was chosen in order to obtain the quickest possible response, since this counteracts an excessive consumption of regeneration gas.

In the flue-gas desulfurization unit described above, which had seven acceptor bed layers in each reactor, the nitrogen oxide emission was simultaneously reduced by the addition of ammonia. This was done while trying out the following possibilities.

I. Through a line 19 ammonia from a storage and dosing apparatus was injected into the line 4 at a rate of 26.5 kg/hour. By means of a NOX meter 20 which worked on the principle of chemiluminescence, a maximum NOX concentration of 0.055 percent by volume was measured in the starting phase of the acceptance, known as the oxidation phase (formation of copper oxide on metallic copper), and a minimum NOX concentration of 0.001 percent by volume at the end of the acceptance phase. The average NOX removal during the entire acceptance was 65 percent by volume. Via connection 21 a measurement signal was transmitted to the control panel.

II. In order to reduce the maximum NOX concentration, the ammonia injection was stopped during the oxidation phase (approximately the first 10 to 15 minutes of the acceptance phase). The maximum NOX concentration in the off-gas in the line 8 fell as a result to 0.035 percent by volume which is the value of the untreated flue-gas - and the average NOX removal consequently rose to 74 percent.

III. A further improvement was achieved by shifting the sampling point of the hydrogen meter 14 to position B in the reactor. By stopping the regeneration at the moment when the hydrogen reached the point B, one acceptor bed layer remained in the sulfate form. This prevented the ammonia from being partly oxidized to nitrogen oxide during the oxidation phase of the acceptor. The maximum NOX concentration was now 0.011 percent by volume and the minimum concentration 0.001 percent by volume. The average NOX removal rose to 87 percent as a result. It was necessary, however, to shorten the acceptance time by approximately 30 percent for the $SO_2$ acceptance to remain at the same level.

IV. A further improvement was achieved by installing an additional acceptor bed layer — the 8th acceptor bed shown in the figure by means of dotted lines - while the sampling point was subsequently transferred to point C. This gave the following results:

| Sampling Point | Max. and min. NOX concentration, in percent by volume | Average NOX removal |
|---|---|---|
| B | 0.012 ; 0.0005 | 90 percent |
| C | 0.0065; 0.0005 | 92 percent |

I claim as my invention:

1. In a process for the simultaneous removal of nitrogen oxides and sulfur oxides from a gas stream containing oxygen, in addition to said oxides, in which process a metal-containing acceptor is used for the acceptance of sulfur oxides in the form of a metal sulfate and ammonia precursor is added to the gas stream for the reduction of the nitrogen oxides to nitrogen, and the metal sulfate-containing acceptor is regenerated at regular intervals by stopping the flow of the gas stream and introducing a reducing gas, the improvement comprising regenerating the acceptor by contacting the acceptor with the reducing gas in a flow counter-current to the direction in which the gas stream to be purified contacts the acceptor, the regeneration being terminated when at least part of the acceptor is still in the metal sulfate form, after which the flow of the oxygen-containing gas stream to be purified is continued.

2. The process of claim 1, in which the regeneration is terminated when at least 10 percent by weight of the acceptor material present is in the metal sulfate form.

3. The process of claim 2, in which the regeneration is terminated when from 12 percent to 30 percent by weight of the acceptor material present is in the metal sulfate form.

4. The method of claim 3, wherein the metal-containing acceptor contains copper.

5. The process of claim 4, wherein the temperature employed during acceptance is from about 325° to 475° C.

* * * * *